(12) United States Patent
Gschwind et al.

(10) Patent No.: US 12,235,609 B2
(45) Date of Patent: Feb. 25, 2025

(54) EXTERIOR PART FOR A TIMEPIECE OR PIECE OF JEWELRY

(71) Applicant: GROUPE ACHOR SA, Delemont (CH)

(72) Inventors: Peter Gschwind, Morat (CH); Alain Beuret, Rossemaison (CH)

(73) Assignee: GROUPE ACHOR SA, Delemont (CH)

( * ) Notice: Subject to any disclaimer, the term of this patent is extended or adjusted under 35 U.S.C. 154(b) by 593 days.

(21) Appl. No.: 17/440,244

(22) PCT Filed: Mar. 20, 2020

(86) PCT No.: PCT/EP2020/057849
§ 371 (c)(1),
(2) Date: Sep. 17, 2021

(87) PCT Pub. No.: WO2020/188102
PCT Pub. Date: Sep. 24, 2020

(65) Prior Publication Data
US 2022/0179362 A1 Jun. 9, 2022

(30) Foreign Application Priority Data
Mar. 20, 2019 (CH) ......................................... 365/19

(51) Int. Cl.
*G04B 19/12* (2006.01)
*A44C 5/02* (2006.01)
(Continued)

(52) U.S. Cl.
CPC ................ *G04B 19/12* (2013.01); *A44C 5/02* (2013.01); *A44C 27/001* (2013.01);
(Continued)

(58) Field of Classification Search
None
See application file for complete search history.

(56) References Cited

U.S. PATENT DOCUMENTS 1,585,542 A * 5/1926 Henry ..................... C03B 25/02
65/117
3,661,546 A * 5/1972 Busdiecker ............. B32B 27/00
65/36
(Continued)

FOREIGN PATENT DOCUMENTS

CN 106030686 10/2016
EP 0402685 12/1990
(Continued)

OTHER PUBLICATIONS

JP 2000226239 machine translation; Hirao, Atsuisa; Flat Glass for Decoration and Its Production, Aug. 2000 (Year: 2000).*
(Continued)

*Primary Examiner* — Queenie S Dehghan
(74) *Attorney, Agent, or Firm* — Wissing Miller LLP

(57) ABSTRACT

A method for manufacturing an exterior part for a timepiece or piece of jewelry made of Murano glass is disclosed. The method comprises providing a material formed of glass rods (2), also referred to as glass tubes, arranged side by side; applying a multi-cycle heat treatment to consolidate the material and form a blank; and machining the blank to produce the exterior part. The heat treatment may comprise a first cycle (a) consisting of heating the material from a temperature less than or equal to 100° C. to a temperature between 450 and 650° C. at a heating rate between 4 and 12° C./min in order to avoid the formation of air bubbles during the manufacturing of the blank. Also disclosed is an exterior part for a timepiece or piece of jewelry, in particular a watch case, having a structure with few or no air bubbles.

19 Claims, 3 Drawing Sheets

(51) Int. Cl.
    *A44C 27/00*     (2006.01)
    *C03B 23/207*     (2006.01)
    *C03B 25/02*     (2006.01)
    *C03B 29/02*     (2006.01)
    *C03C 25/002*     (2018.01)
    *G04B 19/04*     (2006.01)
    *G04B 37/22*     (2006.01)
    *G04D 3/00*     (2006.01)

(52) U.S. Cl.
    CPC .......... *C03B 23/207* (2013.01); *C03B 25/02* (2013.01); *C03B 29/02* (2013.01); *C03C 25/002* (2013.01); *G04B 19/042* (2013.01); *G04B 37/225* (2013.01); *G04D 3/0048* (2013.01)

(56) References Cited

U.S. PATENT DOCUMENTS

| | | | |
|---|---|---|---|
| 4,248,297 A * | 2/1981 | Pei | .......................... C03B 32/02 65/33.1 |
| 6,165,589 A | 12/2000 | Calvanella | |
| 2004/0229026 A1 | 11/2004 | Aylor | |
| 2008/0115534 A1 | 5/2008 | Kernan | |

FOREIGN PATENT DOCUMENTS

| | | |
|---|---|---|
| GB | 2223866 | 4/1990 |
| JP | 506365 A | 1/1975 |
| JP | 03115993 | 5/1991 |
| JP | 2006055365 | 3/2006 |
| WO | 2008007783 | 1/2008 |

OTHER PUBLICATIONS

CN108059327 machine translation, Xue, Lv, Glass Decoration and Manufacturing Method, May 2018 (Year: 2018).*
Chinese Office Action for application No. 2020800226800, dated Jan. 13, 2023.
International Search Report in PCT/EP2020/057849 mailed May 12, 2020.
Machine translation of Office Action in JP 2021-556382, dated Dec. 6, 2023.

* cited by examiner

EXTERIOR PART FOR A TIMEPIECE OR PIECE OF JEWELRY

This application is a 371 of PCT/EP2020/057849 filed on Mar. 20, 2020, published on Sep. 24, 2020 under publication number WO 2020/188102, which claims priority benefits from Swiss Patent Application No. 365/19, filed on Mar. 20, 2019, the disclosure of which is incorporated herein by reference.

OBJECT OF THE INVENTION

The present invention relates to a method for manufacturing an exterior part for a timepiece or a piece of jewelry, and in particular a monocoque watch case made from Murano glass. It also relates to the exterior part resulting from this method.

TECHNOLOGICAL BACKGROUND

One of the typical characteristics of Murano glass is the colored and decorative points that decorate the parts to be worked—the millefiori. "Millefiori" means "thousand flowers" and refers to a special glass production technique. A mixture of glass rods of different colors is fused and partially covered with glass. The varied coloring of the glass rods is based on the use of coloring materials such as silver, gold, iron oxide (rust), etc. After very careful work, the fused glass rods are cut into discs to form what is called Murrine.

To produce exterior parts in clockwork, the Murrine must be machined precisely. By definition, the glass parts are fragile. It has been observed that a standard method for producing Murrine was leading to air bubbles that made the material particularly fragile during machining, which was resulting in significant losses of material.

Document EP 0 402 685 discloses a manufacturing method, and more specifically a machining method for a watch dial made from Murano glass. This document is silent regarding the issue of air bubbles.

BRIEF DESCRIPTION OF THE INVENTION

The present invention aims to address the aforementioned drawback by proposing an optimized method for reducing, or even eliminating the formation of air bubbles during manufacturing so as in fine to facilitate the machining of the exterior part, and to thereby reduce losses of material.

The present invention also proposes an exterior part for a timepiece or a piece of jewelry made from Murano glass and having a structure with few or no air bubbles. It more particularly relates to a watch case made in a single piece from Murano glass.

BRIEF DESCRIPTION OF THE FIGURES

The features and advantages of the present invention will appear upon reading the detailed description below, done in reference to FIGS. 1 to 4.

DETAILED DESCRIPTION OF THE INVENTION

Figure 3A:
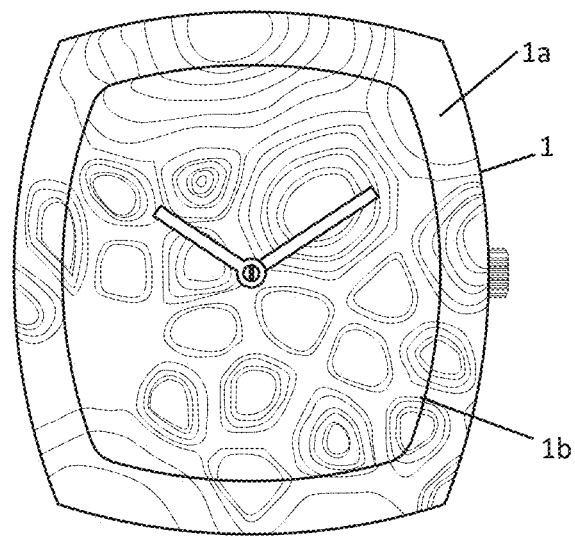
FIG. 3a shows an exterior part formed by a middle and a dial in a single piece made from Murano glass according to the invention.
Figure 3B:
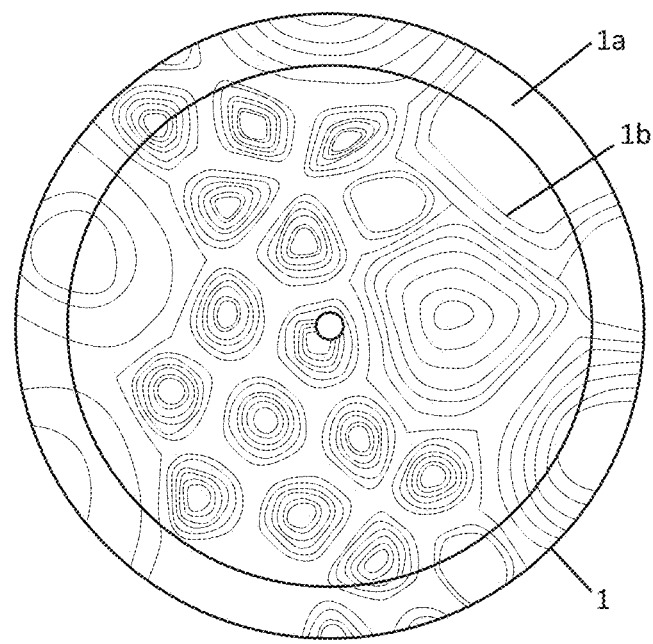
FIG. 3b shows a variant of FIG. 3a with a circular shape of the middle.
Figure 4:
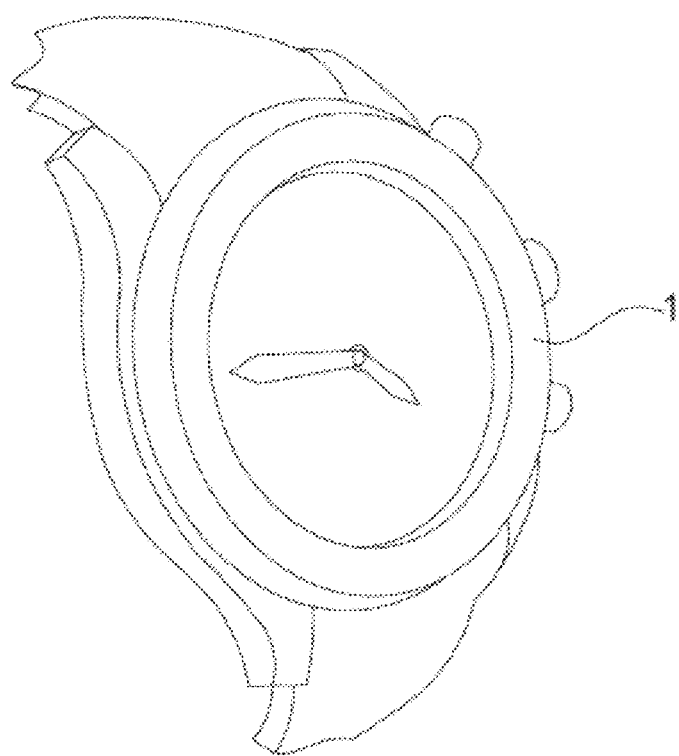
FIG. 4 schematically shows a watch comprising the exterior part of FIG. 3b.

The present invention relates to an exterior part for a timepiece or a piece of jewelry made from Murano glass as well as to the manufacturing method implemented to manufacture the part. In the clockwork field, this part can be a middle, a bottom, a bezel, a push-piece, a bracelet link, a dial, a hand, a dial index, etc. Preferably, it is a monobloc part made entirely from Murano glass including the middle $1a$ and the dial $1b$ to form a watch case 1 as shown in FIGS. 3a and 3b. The dial as well as the middle can assume any shapes (circular, rectangular, square, barrel, etc.). As an illustration, a watch including the monobloc part formed by the middle and the dial forming the watch case 1 is shown in FIG. 4.

Figure 1:
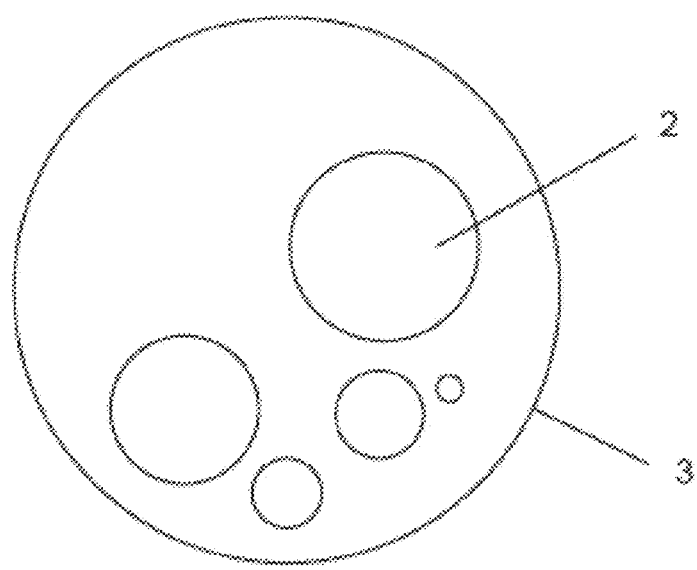
FIG. 1 schematically shows a step of the manufacturing method consisting, in a known manner, in assembling glass rods in a mold.

The manufacturing method includes several steps, including a heat treatment step that is more particularly the object of the invention. Thus, the manufacturing method includes a step consisting in a known manner in producing canes, also called rods, of multicolored glass 2 and in assembling them, after cutting, side by side in a mold 3 (FIG. 1). It then comprises a heat treatment step in order to form a consolidated blank, followed by a machining step in order to shape the blank.

Figure 2:
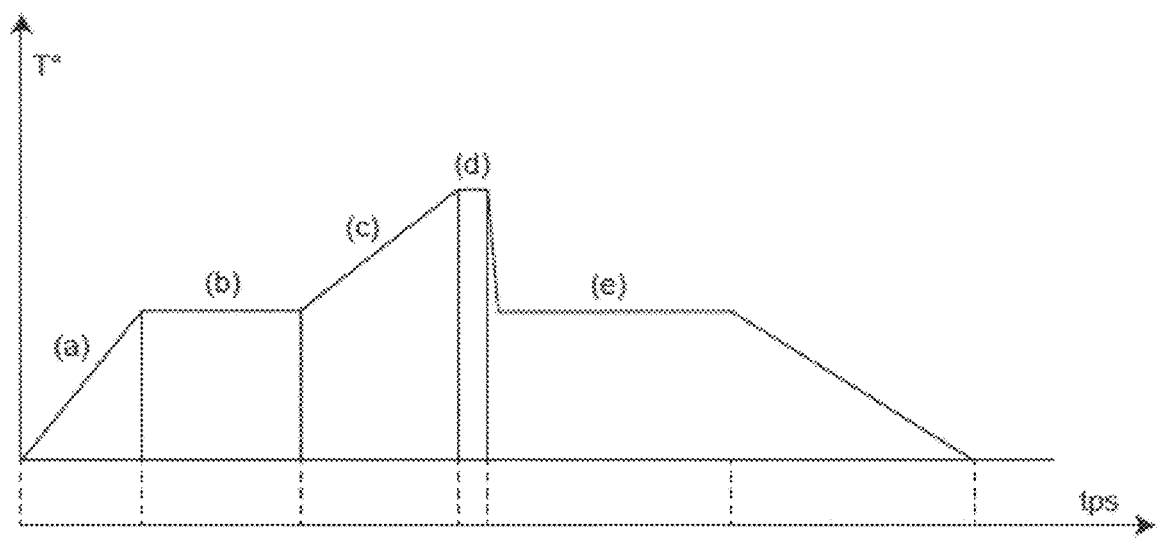
FIG. 2 schematically shows the different temperature cycles of the method according to the invention.

The material formed by the glass rods is subject to the heat treatment according to the invention shown schematically in FIG. 2 in order to form the blank. This heat treatment includes five successive cycles (a)-(e) as follows:

(a): this cycle consists in heating the material. This is the critical cycle to avoid air bubble formation, and this cycle is more particularly the object of the invention;

(b): this is the maintenance cycle aiming to stabilize the movement of the glass rods after the heating cycle;

(c): this is another heating cycle aiming to consolidate the glass rods;

(d): this is a new maintenance cycle aiming to stabilize the material;

(e): this is an expansion cycle aiming to relax the internal stresses within the material.

The first cycle (a) is the most critical for air bubble formation because the glass rods move under the effect of the heat. During this cycle, the material is placed in a furnace that is at a temperature of less than or equal to 100° C., and preferably at ambient temperature. The cycle can be done under an uncontrolled atmosphere. Once the furnace is closed, the furnace is initiated to perform the temperature increase to a temperature comprised between 450 and 650° C., preferably between 500 and 600° C., more preferably between 525 and 575° C., with a heating rate comprised between 4 and 12° C./min, preferably between 5 and 10° C./min, and more preferably between 6 and 9° C./min.

The second, less critical cycle (b) is done at a substantially constant temperature corresponding to the maximum temperature during the heating in step (a). This cycle is done at a temperature comprised between 450 and 650° C., preferably between 500 and 600° C., more preferably between 525 and 575° C., for a time comprised between 40 and 140 minutes, preferably between 70 and 110 minutes, more preferably between 80 and 100 minutes.

The third heating cycle (c) consists in increasing in temperature from the plateau of the second cycle (b) to a temperature comprised between 650 and 900° C., preferably between 720 and 840° C., more preferably between 760 and 800° C. in a time comprised between 40 and 140 minutes, preferably between 70 and 110 minutes, more preferably between 80 and 100 minutes.

The fourth cycle (d) is done at a substantially constant temperature corresponding to the maximum temperature reached during the third cycle (c), namely between 650 and 900° C., preferably between 720 and 840° C., more preferably between 760 and 800° C., for a time comprised between 3 and 17 minutes, preferably between 5 and 15 minutes.

The fifth cycle (e) consists in placing the material in a second furnace, called expansion furnace, after the fourth cycle (d). Typically, the transfer is done in a time of the order of one minute. This cycle can be done under an uncontrolled atmosphere at a temperature comprised between 350 and 650° C., preferably between 450 and 550° C., more preferably between 475 and 525° C., for several days, preferably between 1 and 5 days, more preferably between 2 and 4 days. Next, the material is cooled to ambient temperature and forms the blank.

The blank resulting from the heat treatment forms what is called the Murrine, which is machined to produce the exterior part. Generally, the blank assumes the form of a disc with a thickness of the order of 1 cm. The machining can be done, for example, by diamond grinding. In the case of a watch case, after machining, the hands, the glass and the push-piece are assembled.

The blank resulting from the heat treatment according to the invention has few or no porosities, also called air bubbles. In the absence of pronounced porosity, the blank as well as the machined part are extremely solid despite being made from glass. This absence of porosity makes it possible to machine exterior parts with more complex shapes, like the watch case 1 of FIGS. 3a, 3b and 4 comprising the middle 1a and the dial 1b. To produce the watch case, the center of the blank is hollowed out to produce the dial topped on its perimeter by the middle. This machining operation of the glass is particularly delicate. Any porosity can lead during machining to the formation of cracks or unsightly irregularities, as a result of which the part is ruined. Likewise, the machining of the perimeter of the middle is critical in particular for shapes that have rims, like for the barrel shape of FIG. 3a. These rims can also initiate crack formation or lead to rod separation due to the presence of porosities between the rods if the heat treatment is not optimized.

Furthermore, the absence of porosities makes it possible to prevent moisture from infiltrating the watch case, and thereby to guarantee a certain water resistance to the watch.

The exterior part thus resulting from the manufacturing method has a very nice esthetic effect with colored or transparent raised 3D patterns.

The invention claimed is:

1. A method of manufacturing an exterior part for a timepiece or a piece of jewelry made from Murano glass, said method comprising the following steps:
   providing a material formed by glass rods, arranged side by side,
   applying a multi-cycle heat treatment to consolidate the material and form a blank,
   machining the blank to produce the exterior part, wherein the heat treatment includes a first cycle (a) wherein the material is heated from a first temperature less than or equal to 100 C to a second temperature of between 500 and 600° C. at a heating rate of between 4 and 12° C./min.

2. The method according to claim 1, wherein the heat treatment comprises a second cycle (b) following the first cycle (a), wherein movement of the glass rods is stabilized at a substantially constant stabilizing temperature between 45° and 650° C., for a stabilizing time of between 40 and 140 minutes.

3. The method according to claim 2, wherein the stabilizing temperature is between 50° and 600° C.

4. The method according to claim 2, wherein the stabilizing temperature is between 525 and 575° C.

5. The method according to claim 2, wherein the stabilizing time is between 70 and 110 minutes.

6. The method according to claim 2, wherein the stabilizing time is between 80 and 100 minutes.

7. The method according to claim 2, wherein the heat treatment comprises a third cycle (c) following the second cycle (b), wherein the glass rods are consolidated by heating the material to a consolidation temperature between 650 and 900° C. for a consolidation time between 40 and 140 minutes.

8. The method according to claim 7, wherein the consolidation temperature is between 72° and 840° C.

9. The method according to claim 7, wherein the consolidation temperature is between 76° and 800° C.

10. The method according to claim 7, wherein the consolidation time is between 70 and 110 minutes.

11. The method according to claim 7, wherein the consolidation time is between 80 and 100 minutes.

12. The method according to claim 7, wherein the heat treatment comprises a fourth cycle (d) following the third cycle (c), wherein the consolidated glass rods are further stabilized at the consolidation temperature for a further stabilization time between 3 and 17 minutes.

13. The method according to claim 12, wherein the further stabilization time is between 5 and 15 minutes.

14. The method according to claim 12, wherein the heat treatment comprises a fifth cycle (e) following the fourth cycle (d) wherein the consolidated glass rods are expanded at an expansion temperature between 350 and 650° C., an expansion time wherein the expansion time is between 1 and 5 days, and wherein the material is then cooled to ambient temperature in order to form the blank.

15. The method according to claim 14, wherein the expansion temperature is between 450 and 550° C.

16. The method according to claim 14, wherein the expansion temperature is between 475 and 525° C.

17. The method according to claim 14, wherein the expansion time is between 2 and 4 days.

18. The method according to claim 1, wherein the second temperature is between 525 and 575° C.

19. The method according to claim 1, wherein the heating rate is between 6 and 9° C./min.

* * * * *